United States Patent [19]

Draghetti et al.

[11] Patent Number: 5,477,661

[45] Date of Patent: Dec. 26, 1995

[54] CELLOPHANING MACHINE WRAPPING AND SEALING METHOD

[75] Inventors: Fiorenzo Draghetti, Medicina; Roberto Osti, Zola Predosa, both of Italy

[73] Assignee: G.D Societa' Per Azioni, Bologna, Italy

[21] Appl. No.: 171,850

[22] Filed: Dec. 22, 1993

Related U.S. Application Data

[63] Continuation of Ser. No. 803,089, Dec. 5, 1991, abandoned.

[30] Foreign Application Priority Data

Dec. 12, 1990 [IT] Italy .......................................... 3771/90

[51] Int. Cl.⁶ ............................. B65B 11/00; B65B 49/00
[52] U.S. Cl. .................................. 53/466; 53/477; 53/234; 53/371.6
[58] Field of Search ............................... 53/231, 234, 463, 53/466, 371.6, 376.2, 479, 477, 371.7, 375.9, 387.3

[56] References Cited

U.S. PATENT DOCUMENTS

| | | | |
|---|---|---|---|
| 2,400,682 | 5/1946 | Bronander | 53/234 X |
| 2,855,977 | 10/1958 | Wagner | 53/463 X |
| 3,166,462 | 1/1965 | Schoder | 53/463 X |
| 3,282,760 | 11/1966 | Gutierrez | 53/375.9 X |
| 4,186,544 | 2/1980 | Johnson | 53/234 X |
| 4,202,151 | 5/1980 | Focke et al. | 53/371.7 X |
| 4,408,439 | 10/1983 | Anderson | 53/466 X |
| 4,909,019 | 3/1990 | Delacretaz et al. | 53/466 X |

FOREIGN PATENT DOCUMENTS

| | | |
|---|---|---|
| 4331673 | 6/1974 | United Kingdom . |
| 5981373 | 7/1976 | United Kingdom . |

*Primary Examiner*—Linda Johnson
*Attorney, Agent, or Firm*—Klauber & Jackson

[57] ABSTRACT

A wrapping and sealing method for a cellophaning machine, whereby a first conveying device, defined by two spaced parallel disks and having pockets, provides for forming tubular wrappings about packets by feeding the packets and respective sheets of wrapping material in steps through at least one sealing station, and is engaged by a loop conveyor extending partially between the two disks, and which successively extracts the partially wrapped packets from the pockets on the first conveying device and, after folding the ends of each tubular wrapping on to the respective packet, feeds the packets into respective pockets on a second conveying device having end sealing devices.

16 Claims, 3 Drawing Sheets

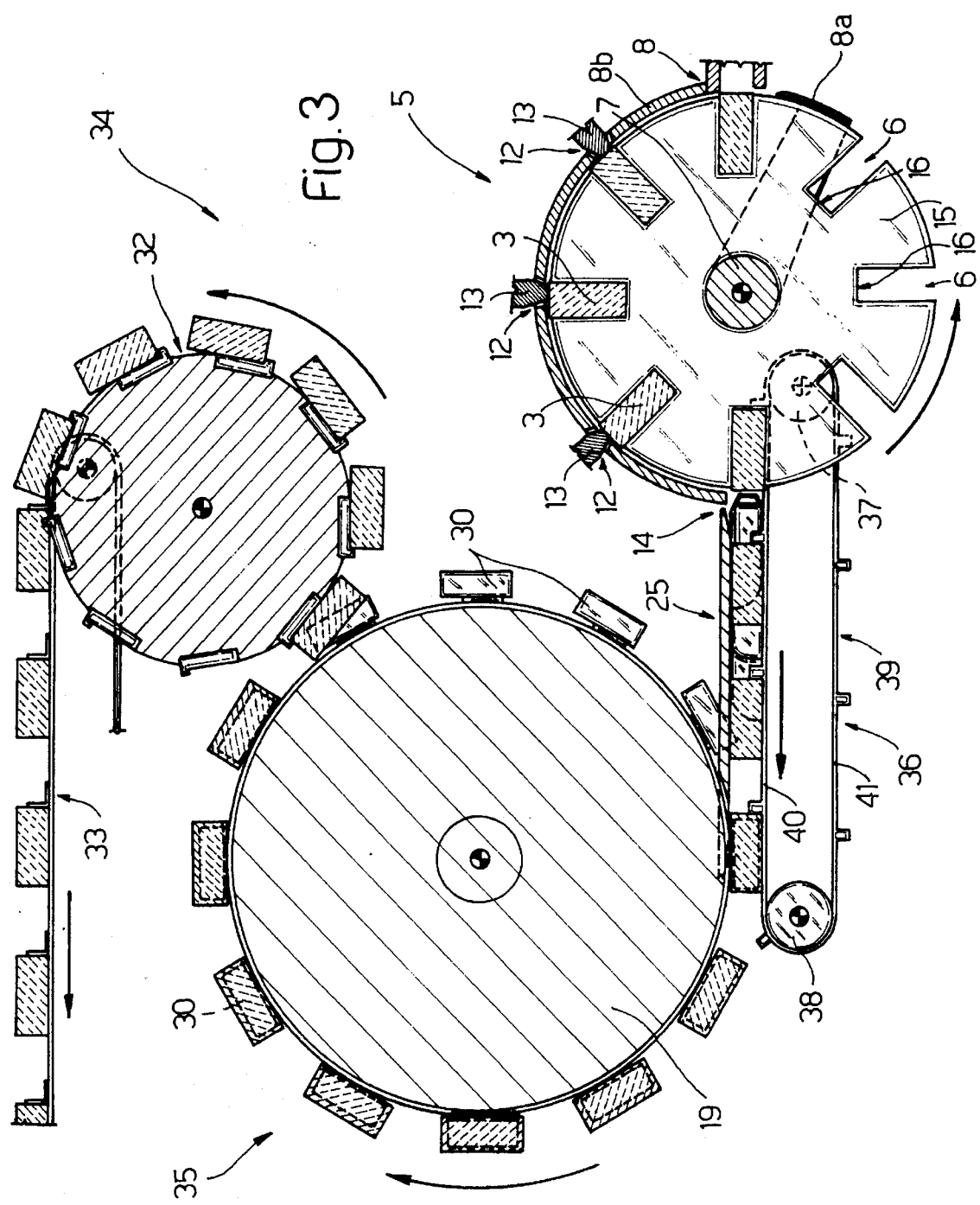

CELLOPHANING MACHINE WRAPPING AND SEALING METHOD

This application is a continuation, of application Ser. No. 07/803,089, filed Dec. 5, 1991 now abandoned.

BACKGROUND OF THE INVENTION

The present invention relates to a cellophaning machine wrapping and sealing method.

In particular, the present invention relates to a wrapping and sealing method for wrapping packets, particularly packets of cigarettes, in transparent material on a cellophaning machine.

On cellophaning machines, sheets of transparent material and respective packets are fed successively to a conveying device normally consisting of a roller with a number of pockets, each designed to receive a group consisting of a sheet of transparent material folded in a U, and a respective packet. The roller is turned about its axis so as to feed the groups in steps along a substantially circular path and through at least one sealing station, where, during a pause in rotation of the roller, a sealing device engages the sheet and seals it about the respective packet in the form of a tubular wrapping, the ends of which are open and project axially outwards of the respective pocket.

Once the tubular wrapping is formed, the conveying device feeds the groups successively to an unloading station, where, during respective pauses in rotation of the roller, a radial pusher, mounted in a fixed position inside the roller, expels the groups successively from the pockets on to an output conveyor. As the groups are fed forward in steps on the output conveyor, the open ends of the tubular wrappings are folded on to the ends of the packets, after which, the groups are fed between at least two opposed sealing devices, which, during a pause in the operation of the output conveyor, seal the folded opposite ends of each wrapping.

Though extremely efficient, the above known wrapping method has proved inadequate over and above a given operating speed.

Firstly, due to the presence of a reciprocating pusher for expelling the groups from the pockets on the conveying device, this must be arrested for as long as the pusher engages the unloading station. As the pusher is usually cam-activated, this obviously poses limitations on the operating speed of the pusher and, consequently, the output speed of the machine as a whole. Attempts to overcome this drawback by operating the pusher by means of a crank system have resulted in only a relatively small increase in production speed, due to the fact that, over and above a given limit, the speed of the pusher invariably damages the packets.

Secondly, over and above a given production speed, the above known wrapping method requires pairs of fixed sealing devices comprising opposed sealing plates for simultaneously sealing a number of groups. The drawback here lies in the size of the plates, which can rarely be designed so as to perfectly contact the entire end surface of the packets, thus resulting in imperfect sealing of the folded ends of the tubular wrapping. Moreover, in the event the groups are fed contacting one another between the sealing plates, the possibility also exists of the groups being sealed to one another.

Finally, further drawbacks are posed by the fact that the packets are fed forward in steps, and that the sealing devices only operate during pauses in the operation of the output conveyor. As any expert in this particular field is aware, it is extremely difficult to accurately adjust the temperature of discontinuously-operating sealing devices, in the event of a variation in the operating speed of the cellophaning machine.

SUMMARY OF THE INVENTION

It is an object of the present invention to provide a wrapping and sealing method designed to overcome the aforementioned drawbacks.

According to the present invention, there is provided a wrapping and sealing method for wrapping packets in transparent material wrappings on a cellophaning machine, said method comprising a stage wherein a first conveying device, having a number of first pocket means, provides for forming tubular wrappings about respective packets, by feeding said packets and respective sheets of transparent wrapping material in steps through at least one sealing station; said method being characterised by the fact that it comprises a further stage wherein a continuously-moving loop conveyor provides for successively extracting groups, each consisting of a packet and a respective said tubular wrapping, from respective said first pocket means on said first conveying device, which is defined by two parallel conveyors set apart and between which at least part of said loop conveyor extends; said loop conveyor feeding each said group into engagement with folding means whereby end portions of each said tubular wrapping are folded on to said packet, and feeding each said group into a respective second pocket means on a second continuously-moving conveying device wherein each said second pocket means is defined, at least partially, by a pair of end sealing devices supported on said second conveying device and moving in opposite directions to and from a sealing position.

BRIEF DESCRIPTION OF THE DRAWINGS

A number of non-limiting embodiments of the present invention will be described by way of example with reference to the accompanying drawings, in which:

FIG. 3 shows a schematic side view of a second embodiment of the output portion of a cellophaning machine implementing the method according to the present invention.

DETAILED DESCRIPTION OF THE INVENTION

Figure 1:
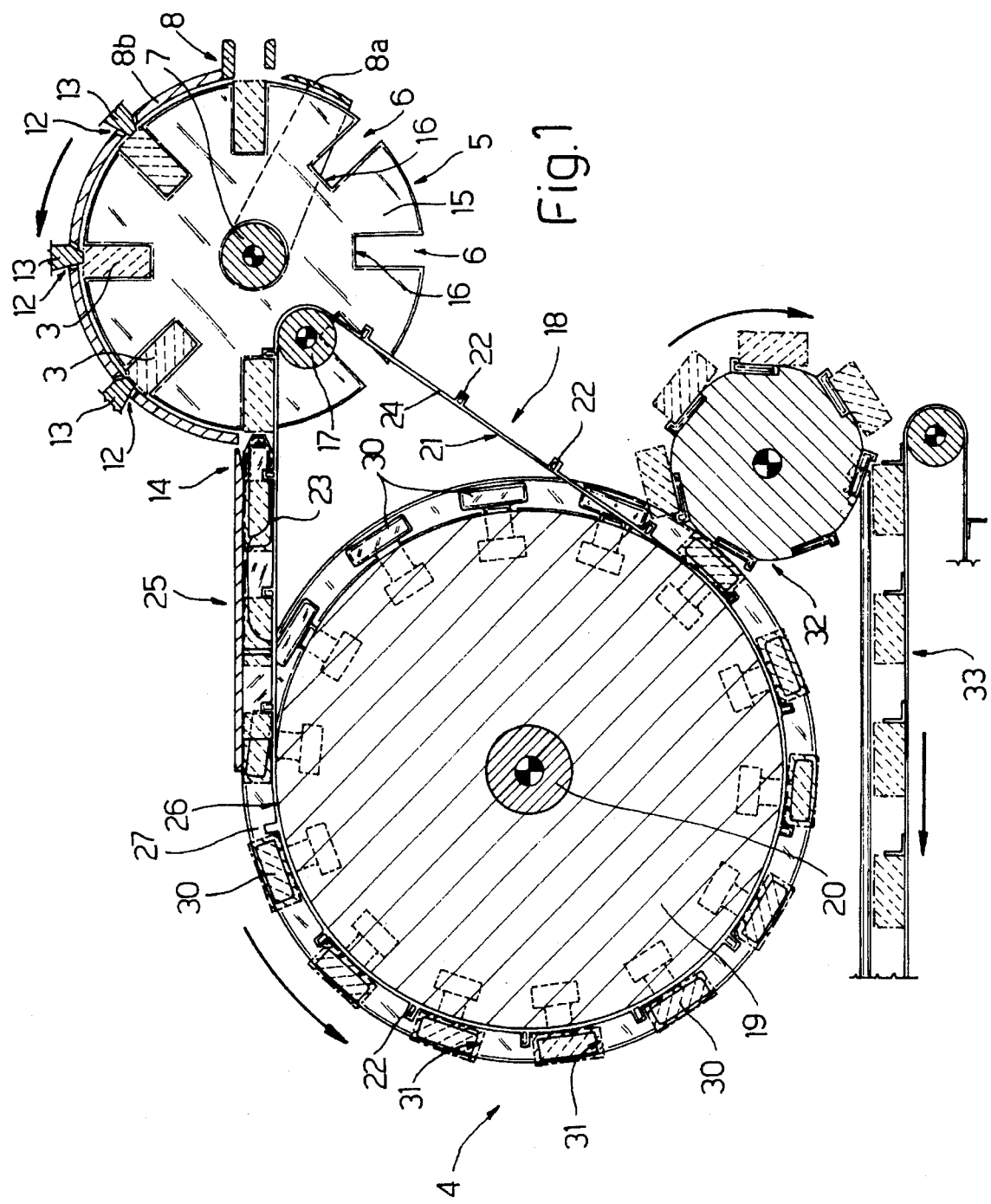
FIG. 1 shows a schematic side view of a first preferred embodiment of the output portion of a cellophaning machine implementing the method according to the present invention.

Number 1 in FIG. 1 indicates a cellophaning machine for forming wrappings 2 (FIG. 2) of transparent material about packets 3 consisting, in the example shown, of packets of cigarettes.

Machine 1 presents an output portion 4 comprising a first conveying device defined by a substantially cylindrical wrapping wheel 5 having a number of peripheral axial pockets 6 open both radially outwards and at their opposite axial ends. Wheel 5 presents a powered shaft 7 by which it is rotated in steps anticlockwise in FIGS. 1 and 2.

Figure 2:
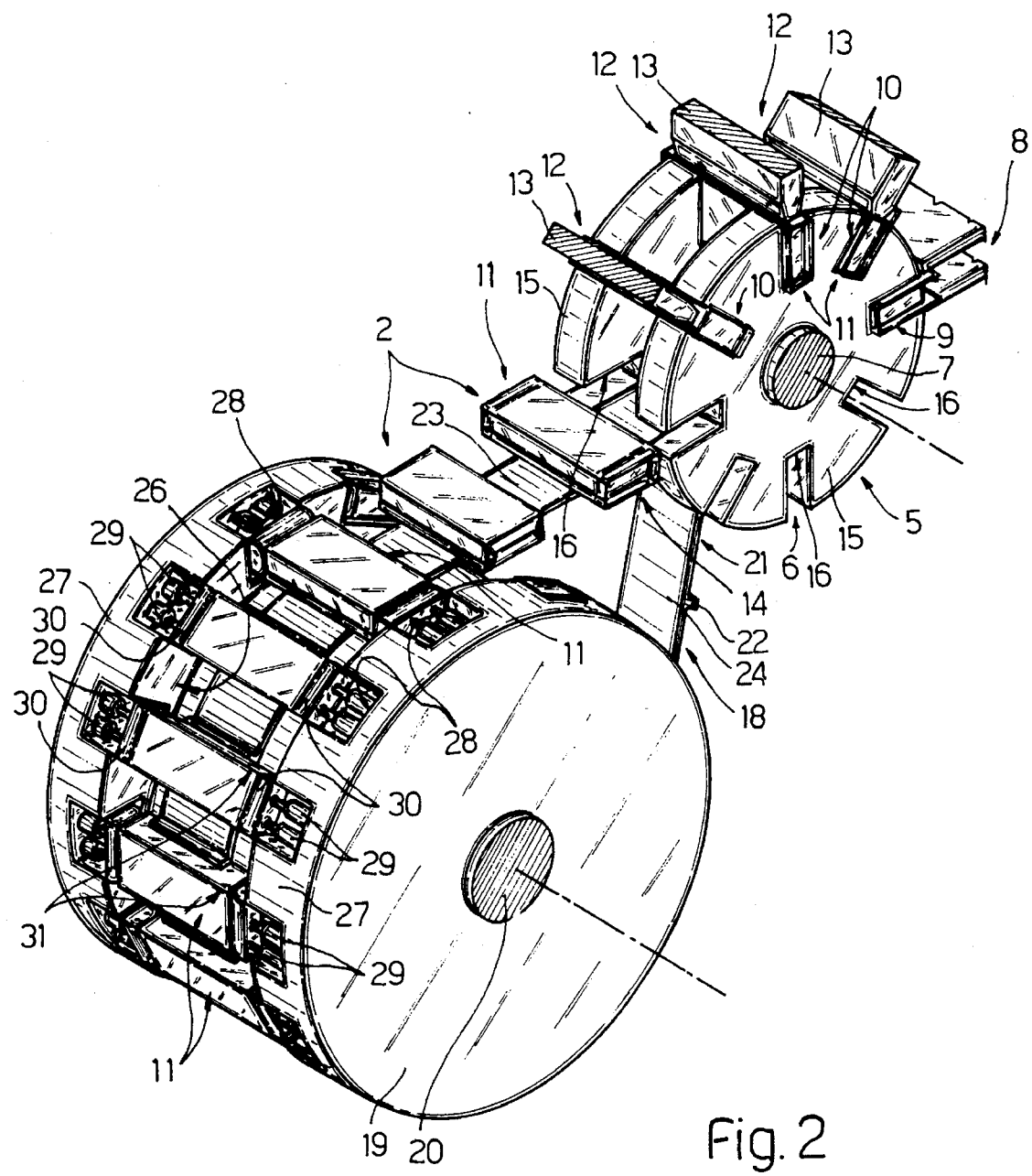
FIG. 2 shows a schematic view in perspective of a detail on the FIG. 1 machine.

As shown in FIG. 2, when stopped in loading station 8, each pocket 6 receives simultaneously a sheet 9 of transparent wrapping material supplied by known means (not shown), and a packet 3 also supplied by known means (not shown), which insert packet 3 and sheet 9 in known manner inside pocket 6, with sheet 9 folded in a U about packet 3.

During said pause and the next step commencing from loading station 8, the ends of U-shaped sheet 9 are engaged (FIG. 1) by known movable and fixed folding devices 8a, 8b, and folded one on top of the other to produce a tubular wrapping 10, the open opposite ends of which project from the open axial ends of pocket 6.

As shown in FIG. 2, each pocket 6 feeds the group 11 consisting of packet 3 and wrapping 10 through at least one sealing station 12 (in the example shown, three sealing stations 12 are provided) where each group 11 is arrested to enable a respective known external axial sealing device 13 to contact and fully seal the superimposed ends of wrapping 10 prior to group 11 reaching unloading station 14.

As shown in FIG. 2, wrapping wheel 5 comprises two parallel, coaxial disks 15 fitted a given distance apart on shaft 7, and each having a number of peripheral recesses 16 defining respective pockets 6 with the respective recesses 16 on the other disk 15.

As shown in FIG. 1, between disks 15, there is mounted a fixed end pulley 17 of a loop conveyor 18, a second pulley of which consists of a second conveying device defined by a drum 19 fitted on to a powered shaft 20 parallel to pulley 17 and shaft 7 and rotating continuously so as to drive, continuously and anticlockwise in FIG. 1, a belt 21 looped about pulley 17 and drum 19. According to a variation (not shown), conveyor 18 may be operated intermittently.

Belt 21 presents a number of external projections or pushers 22 separated by a distance at least equal to the width of groups 11, and comprises a top branch 23 and a bottom branch 24, the former extending through unloading station 14 and radially in relation to disks 15. When drum 19 is rotated (anticlockwise in FIG. 1), top branch 23 travels from wheel 5 towards drum 19, the rotation speed of which is such as to enable projections 22 to engage and remove groups 11 from respective pockets 6, as groups 11 on wheel 5 are arrested in unloading station 14.

Belt 21, by virtue of operating continuously, therefore acts as a non-reciprocating extracting device for groups 11, capable of operating at relatively high speed. Moreover, the spacing of projections 22 is preferably much greater than the width of groups 11, so that, on reaching unloading station 14, each group 11 starts withdrawing radially due to friction with top branch 23 of belt 21, thus softening the impact with projection 22 and so enabling extremely high speed of belt 21 and consequently also machine 1.

As shown in FIG. 1, at least part of top branch 23 of belt 21 extends outwards of wheel 5 and along known fixed helical folding devices 25, which fold the opposite ends of tubular wrappings 10 on to the ends of packets 3 as groups 11 are transferred from wheel 5 to drum 19.

As shown particularly in FIG. 2, drum 19 presents a central annular groove 26 defining two lateral annular shoulders 27 located on opposite sides of groove 26 and having a number of aligned axial recesses 28. Each aligned pair of recesses 28 houses two opposed actuating devices 29, each located between one end of recess 28 and a sealing device 30 moved by actuating device 29 to and from the other sealing device 30, so as to define, on drum 19, a pocket 31 designed to receive a respective group 11, and the length of which varies to and from a minimum equal to the length of group 11.

As drum 19 rotates, groups 11 are fed successively by belt 21 into respective pockets 31 inside which they are retained, usually by suction, and fed about the periphery of drum 19 to an unloading station 32 (FIG. 1) wherein belt 21 still contacts the bottom of groove 26, and the outer periphery of drum 19 is tangent to a known unloading wheel 32 by which wrapped packets 3 are removed from drum 19 in known manner (usually by suction) and fed on to an unloading conveyor 33.

Throughout the time taken to travel about the periphery of drum 19, each group 11 is maintained contacting a respective pair of sealing devices 30, which are pushed towards each other by respective actuating devices 29 so as to seal the ends of wrapping 10 over a relatively long period of time. For this reason, despite the relatively high speed of drum 19, the temperature of sealing devices 30 may be maintained relatively low, certainly low enough to enable the elimination of high-cost control devices normally employed on known cellophaning machines for preventing wrappings 10 from melting and/or burning as a result of overheating.

Moreover, by operating on individual groups 11, sealing devices 30 may be so designed as to mate perfectly with the ends of respective groups 11, thus preventing them from being sealed to one another.

The FIG. 3 embodiment relates to a cellophaning machine 34 having an output portion 35 comprising a first conveying device defined by a wrapping wheel substantially similar to and therefore indicated by the same reference number as wheel 5; a second conveying device defined by a drum substantially similar to and therefore indicated by the same reference number as drum 19; and an unloading wheel and output conveyor substantially similar to and therefore also indicated using the same reference numbers as wheel 32 and conveyor 33.

Output portion 35 of machine 34 differs substantially from output portion 4 of machine 1 by comprising, in place of loop conveyor 18, a loop conveyor 36 comprising a first pulley 37 located, like pulley 17, between disks 15 of wheel 5; a second pulley 38 substantially tangent to the outer periphery of drum 19; and a belt 39 substantially similar to belt 21 and looped about pulleys 37 and 38. Belt 39 comprises two branches 40 and 41, the top branch 40 of which extends through unloading station 14 and radially outwards in relation to wheel 5. Pulley 38 of conveyor 36 is powered for driving belt 39 continuously and at the same surface speed as drum 19, though the speeds of pulley 38 and drum 19 are not rigidly related to the speed of wrapping wheel 5. On machine 34, drum 19 obviously rotates in the opposite direction to wheel 5.

We claim:

1. A method for wrapping and sealing packets (3) in respective sheets of wrapping material (9), said method comprising the steps of:

a) feeding a packet (3) and a respective sheet of wrapping material (9) into a first pocket means (6) of a first conveying means (5);

b) folding and sealing said respective sheet of wrapping material (9) around said packet (3) while the whole is seated in said first pocket means (6) and transported by said first conveying means (5) so as to produce a respective tubular wrapping (10) having open opposite end portions;

c) transferring said packet (3) and said respective tubular wrapping (10) from said first pocket means (6) of said first conveying means (5) to a second conveying means (18 or 36);

d) folding said open opposite end portions of said respective tubular wrapping (10) against the associated ends of said packet (3) while the whole is transported by said second conveying means (18 or 36) so as to produce a respective folded wrapping having folded opposite end portions;

e) transferring said packet (3) and said respective folded wrapping from said second conveying means (18 or 36) into a second pocket means (31) of a third conveying means (19); and f) sealing said folded opposite end portions of said respective folded wrapping over the associated ends of said packet (3) with end sealing means (30) that are transported by said third conveying means (19) while the whole is seated in said second pocket means (31) and transported by said third conveying means (19) so as to produce a respective sealed wrapping.

2. The method as defined in claim 1, further comprising the step of:

g) transferring said packet (3) and said respective sealed wrapping from said second pocket means (31) of said third conveying means (19) to a fourth conveying means (32 and 33).

3. The method as defined in claim 1, wherein said step of feeding said packet (3) and said respective sheet of wrapping material (9) into said first pocket means (6) of said first conveying means (5) comprises the step of intermittently feeding said packet (3) and said respective sheet of wrapping material (9) into said first pocket means (6) of said first conveying means (5).

4. The method as defined in claim 1, wherein said step of sealing said folded opposite end portions of said respective folded wrapping over the associated ends of said packet (3) comprises the step of sealing said folded opposite end portions of said respective folded wrapping over the associated ends of said packet (3) with end sealing means (30) that define, at least partially, said second pocket means (31).

5. The method as defined in claim 4, wherein said step of sealing said folded opposite end portions of said respective folded wrapping over the associated ends of said packet (3) with end sealing means (30) comprises the step of moving two end sealing devices (30) to and from a sealing position against said folded opposite end portions of said respective folded wrapping.

6. A machine for wrapping and sealing packets (3) in respective sheets of wrapping material (9), said machine comprising:

a) first conveying means (5) having a first pocket means (6) for accepting a packet (3) and a respective sheet of wrapping material (9) therein;

b) means for folding and sealing said respective sheet of wrapping material (9) around said packet (3) while the whole is seated in said first pocket means (6) and transported by said first conveying means (5), said means for folding and sealing said respective sheet of wrapping material (9) producing a respective tubular wrapping (10) having open opposite end portions;

c) second conveying means (18 or 36) for transporting said packet (3) and said respective tubular wrapping (10) thereon upon receipt thereof from said first pocket means (6) of said first conveying means (5);

d) means for folding said open opposite end portions of said respective tubular wrapping (10) against the associated ends of said packet (3) while the whole is transported by said second conveying means (18 or 36), said means for folding said open opposite end portions of said respective tubular wrapping (10) producing a respective folded wrapping having folded opposite end portions;

e) third conveying means (19) having a second pocket means (31) for accepting said packet (3) and said respective folded wrapping therein upon receipt thereof from said second conveying means (18 or 36);

f) means for sealing said folded opposite end portions of said respective folded wrapping over the associated ends of said packet (3) while the whole is seated in said second pocket means (31) and transported by said third conveying means (19), said means for sealing said folded opposite end portions of said respective folded wrapping being transported by said third conveying means (19), said means for sealing said folded opposite end portions of said respective folded wrapping producing a respective sealed wrapping.

7. The machine as defined in claim 6, further comprising:

g) fourth conveying means (32 and 33) for transporting said packet (3) and said respective sealed wrapping thereon upon receipt thereof from said second pocket means (31) of said third conveying means (19).

8. The machine as defined in claim 7, wherein said first conveying means (5) comprises a pair of parallel coaxial disks (15), said pair of parallel coaxial disks (15) having said first pocket means (6) formed around the periphery thereof.

9. The machine as defined in claim 8, wherein said second conveying means (18 or 36) comprises a loop conveyor (18 or 36) comprising a branch (23 or 40) extending radially between said pair of parallel coaxial disks (15) and through an unloading station (14) where said packet (3) and said respective tubular wrapping (10) is unloaded from said first pocket means (6).

10. The machine as defined in claim 9, wherein said loop conveyor (18 or 36) comprises a plurality of projections or pushers (22) moving, along said branch (23 or 40), outwards in relation to said first pocket means (6), and wherein said packet (3) and said respective tubular wrapping (10) are unloaded from said first pocket means (6) by a corresponding one of said plurality of projections or pushers (22).

11. The machine as defined in claim 9, wherein said second pocket means (31) is defined, at least partially, by said means for sealing said folded opposite end portions, and wherein said means for sealing said folded opposite end portions comprises a pair of end sealing devices (30) which are supported on said third conveying means (19).

12. The machine as defined in claim 11, wherein said pair of end sealing devices (30) are movable to and from a sealing position against said folded opposite end portions of said respective folded wrapping over the associated ends of said packet (3).

13. The machine as defined in claim 11, wherein said third conveying means (19) comprises a drum (19) about which said loop conveyor (18) is wound, said drum (19) having said second pocket means (31) formed around the periphery thereof.

14. The machine as defined in claim 13, wherein said drum (19) is tangent to said fourth conveying means (32 and 33) at a point on its periphery about which said loop conveyor (18) is wound.

15. The machine as defined in claim 11, wherein said third conveying means (19) comprises a drum (19) that is tangent to said loop conveyor (36) and to said fourth conveying means (32 and 33), said drum (19) having said second pocket means (31) formed around the periphery thereof.

16. The machine as defined in claim 7, wherein said means for folding said open opposite end portions of said respective tubular wrapping (10) against the associated ends of said packet (3) comprises helical folding devices (25).

* * * * *